United States Patent [19]

Caniglia

[11] Patent Number: 4,546,517

[45] Date of Patent: Oct. 15, 1985

[54] WIPING DEVICE

[76] Inventor: Joseph E. Caniglia, 5368 E. 134th St., Garfield Heights, Ohio 44125

[21] Appl. No.: 585,857

[22] Filed: Mar. 2, 1984

Related U.S. Application Data

[63] Continuation-in-part of Ser. No. 301,310, Sep. 11, 1981, Pat. No. 4,434,520.

[51] Int. Cl.[4] ............................................. G02C 13/00
[52] U.S. Cl. ........................................ 15/214; 15/104.94
[58] Field of Search ............ 15/104.94, 210 R, 210 A, 15/210 B, 214, 218, 218.1, 244 R, 244 A; 401/10

[56] References Cited

U.S. PATENT DOCUMENTS

| | | | |
|---|---|---|---|
| 1,003,761 | 9/1911 | Lehmann | 15/214 |
| 1,602,333 | 10/1926 | Burke | 15/214 |
| 2,055,314 | 9/1936 | Seburger | 15/214 X |
| 2,458,015 | 1/1949 | McDonald | 15/214 |
| 2,490,636 | 12/1949 | Klein | 15/214 |
| 2,658,221 | 11/1953 | Nicoli | 15/210 A X |
| 2,723,412 | 11/1955 | Harris | 15/244 R X |
| 2,819,484 | 1/1958 | Fouse | 15/210 A X |
| 3,643,279 | 2/1979 | Bruhl | 15/214 X |
| 3,647,059 | 3/1972 | Humphreys | 15/214 |
| 4,126,962 | 11/1978 | Polcaro | 15/210 R |

FOREIGN PATENT DOCUMENTS 2840607  3/1980  Fed. Rep. of Germany ........ 15/214

*Primary Examiner*—Edward L. Roberts
*Attorney, Agent, or Firm*—Maky, Renner, Otto & Boisselle

[57] ABSTRACT

An apparatus for wiping lenses or the like to clean them includes a wiping means for wiping a lens and a support means for supporting the wiping means in operative relation. Adhesive means may be used to attach the wiping means to the support means. Respective support means may be connected by a force fit frictional engagement of a protruding member in a receptacle associated with respective support means. A pair of support means may have respective heads for holding respective wiping means in operative relation; one of the heads may be concave and the other convex with respect to a plane therebetween. Moreover, means to facilitate manual grasping of the apparatus for convenient use also may be provided as part of the support means. A cleaning material or the like may be provided in the wiping material. A break-away locking mechanism holds the support means in parallel positional relationship for ordinary use, and in response to application of adequate force, the break-away locking mechanism releases to permit relative rotation of the two support means.

13 Claims, 9 Drawing Figures

WIPING DEVICE

This is a continuation-in-part of my copending U.S. patent application Ser. No. 301,310, filed Sept. 11, 1981 now U.S. Pat. No. 4,434,520.

TECHNICAL FIELD

The present invention relates generally to wiping devices, more particular to devices for wiping lenses, and in the preferred form to an apparatus for wiping eyeglass lenses to clean them.

BACKGROUND OF PRIOR ART

Users of eyeglasses often are disturbed by dirt, water, e.g. from rain, or the like that accumulates on the lenses and by the need occasionally, and sometimes all too frequently, to clean the lenses. Typically users of eyeglasses clean the lenses by wiping with a paper towel, tissue, handkerchief, other cloth, and sometimes with a special wiping cloth intended for eyeglass lenses. Such prior wiping means usually are not as clean as they should be because of the manner in which they are stored or otherwise are used, and, therefore, when used do not fully clean eyeglass lenses. Also, a satisfactory and clean wiping device is not always conveniently available when needed to wipe lenses.

Several U-shape wiping devices have been developed in the past for wiping eyeglass lenses. Such devices typically include a pair of interconnected resilent supports on which wiping material is mounted. The supports may be separated or allowed to separate to permit a lens to pass between the wiping material, and the device may be resiliently deformed to urge the wiping material into engagement into the lenses to wipe them. There are a number of disadvantages encountered with such prior devices which the present invention is intended to overcome. For example, in some prior devices abrasion of the lenses may occur, and in others the wiping material may too easily become dirty. Moreover, some of such prior devices are relatively expensive.

BRIEF SUMMARY OF INVENTION

As it is described herein, the preferred embodiment of the present invention relates to an apparatus for wiping eyeglass lenses. It will be appreciated, however, that the invention may be used for wiping other types of lenses and the like.

Fundamentally and in accordance with the invention there is provided an apparatus for wiping lenses or the like to clean them, and such an apparatus is adaptable to wipe simultaneously opposite sides of a lens or the like or may be pivotably opened to wipe a single surface. The apparatus includes wiping means for wiping a lens and support means for supporting the wiping means in operative relation to effect such cleaning. According to one aspect of the invention adhesive means attaches the wiping means to support means, and according to another aspect a tapered connector arrangement provides a force fit frictional interconnection for holding a pair of support means to place the wiping means in operative relation. According to an additional aspect the support means includes a pair of relatively large head portions to which respective wiping means are rotatably coupled, and the head portions are respectively concave and convex relative to a plane therebetween or at least one of the head portions is so curbed. According to a further aspect an enlarged body portion and ribs at one end of the support means facilitate secure manual grasping of the apparatus for use.

With the foregoing in mind a primary object of the present invention is to improve wiping devices and, more particularly, to improve eyeglass wiping devices.

An another object is to facilitate cleaning lenses and, more particularly, eyeglass lenses.

An additional object is to keep clean the wiping surfaces of wiping material used in a device for wiping lenses.

A further object is to avoid abrasion of lenses by a wiping device therefor.

Still another object is to improve the wiping characteristics of a device for wiping lenses, especially to clean such lenses.

Still an additional object is to facilitate connecting supports of wiping material in an apparatus for wiping lenses.

Still a further object is to facilitate the manual grasping and use of a device for wiping lenses.

Even another object is to reduce and preferrably to minimize the cost for an eyeglass wiping device.

Even an additional objection is to provide an eyeglass wiping device that can be carried in a purse, pocket or the like ready for use at virtually any time, to provide such a device that remains relatively clean ready for use at virtually any time, to avoid dirtying or otherwise disturbing the medium in which the device is carried, as well as to enable relatively facile cleaning of the wiping material of such apparatus.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figure 1:
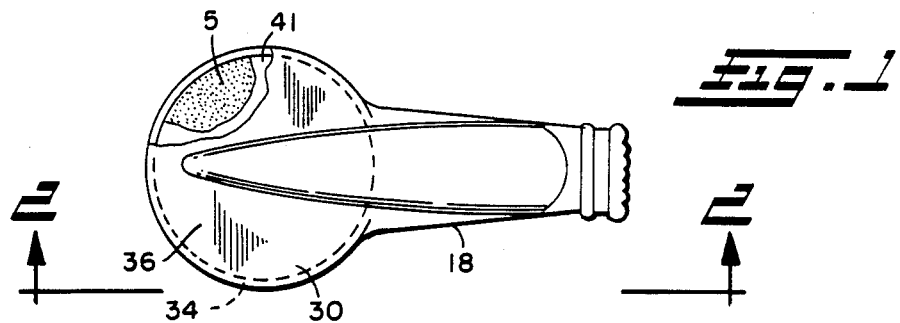
FIG. 1 is a top plan view, partly broken away, of the eyeglass wiping device of the invention.

Referring in detail to the drawing, in FIGS. 1-5 an eyeglass wiping device according to the invention is shown at 1. The device 1 includes upper and lower parts 2,3 which are interconnected mechanically by a connector 4. Each of the upper and lower parts 2,3 includes wiping material 5,6 and support means 7,8 that support the wiping material and that are coupled by the connector 4 to hold the wiping material in relationship operatively to wipe a lens placed therebetween.

The device 1 includes a wiping portion 10 which is used to wipe a lens and enlarged body portion 11 which is constructed in a manner to facilitate manual grasping of the device 1 and manipulation thereof to wipe a lens or the like. The wiping portion 10 also may be designed to facilitate manual grasping of the overall device 1. The enlarged body portion 11, accordingly, includes a pair of enlarged bodies 12,13 at ends of the support means 7,8 remote from the wiping portion 10. The enlarged bodies 12,13 may be of a size that conveniently fit into the hand of the user, such as in the palm of the hand while the thumb and forefinger of the hand extend toward and possibly over at least part of the wiping portion 10. Furthermore, the enlarged body portion 11 includes smoothly curved rib surfaces 14,15, which with the spacing and arrangement of the support arms 18,19 relative to each other and to the enlarged body portion 11 facilitate secure manual grasping of the device 1. Preferably the edges or corners of the device that are exposed to a hand of a user are smoothly curved to avoid concentrated pressure or force that might cause discomfort to a user or tearing of the user's clothing.

The connector means 4 is located at the enlarged body portion 11. The connector means includes a protruding generally cylindrical member 20 seen in FIGS. 1-4 which extends upwardly from its base area 20' adjacent and coupled to the enlarged body 13 of the lower part 3 of the device 1. The protrusion member 20 is stepped, including rounded protrusions 21,22 where the major extent of the member 20 leaves or protrudes from the body 13. The members 20 (20 primarily referring to the longer part or protrusion portion), and 21,22 also may be tapered, being wider near the base 20'; and the stepped protrusion portions 21,22 are of lower height that the protrusion 20.

The connector means 4 also includes a receptacle or socket 25 in the enlarged body 12 of the uper part 2 of the device 1. The receptacle 25 is of a size and configuration adapted to receive the members 20-22 in close fitting intimate relation in the manner illustrated in FIG. 2, and it is closed on all four sides and at one end to prevent access to the member 20 that would otherwise too easily permit separating of the bodies 12,13. To assure strength and security of the connection between members 20-22 and receptacle 25, preferably at least one, and preferably the members 20-22, are tapered so that a reasonable amount of force is required fully to insert the protrusion(s) into the receptacle and so that the frictional retention of the same will be adequate to avoid unwanted separation of the parts 2,3 after they have been assembled in the manner shown in FIG. 2.

Figure 2:
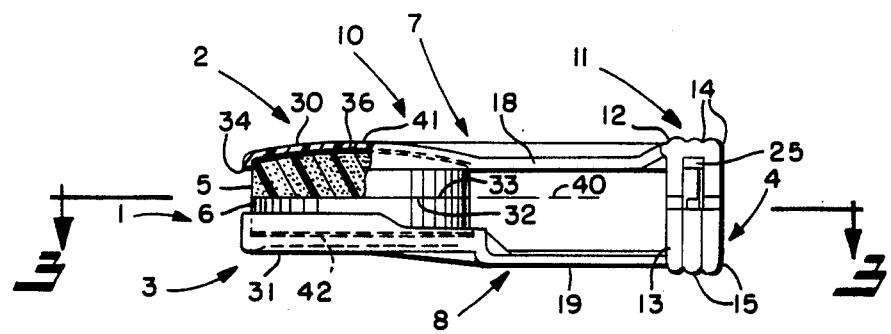
FIG. 2 is a side elevation view, partly broken away in section, looking in the direction of arrows 2—2 of FIG. 1.
Figures 7, 8:
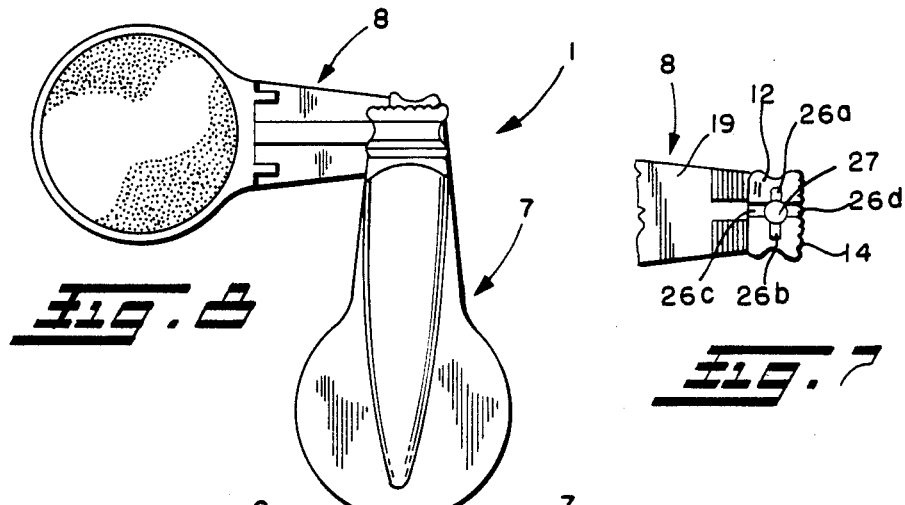
FIG. 7 is a partial bottom plan view of the connector receptacle of the device looking along the arrows 7—7 of FIG. 6.
FIGS. 8 and 9 are top plan views showing the two pivoted orientations of the device.
Figure 9:
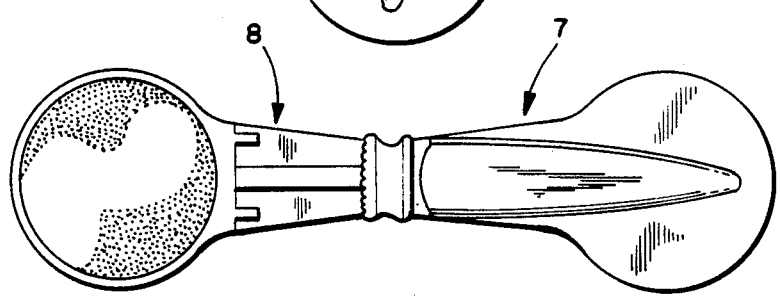

The receptacle 25 is stepped (FIGS. 2, and 5-7) with shallow areas 26a-26d and deep area 27. The deep receptacle area 27 is cylindrical and permits secure interfit with protrusion 20 while still permitting rotation about the common axis of such cylindrical area 27 and protrusion 20. The shallow areas 26a,26b are at opposite sides of the body 14 in a line with the deep area 27 like the line 23 (FIG. 3) to receive inserted therein the stepped protrusions 21,22 when the protrusion 20 is fully inserted into the deep area 27. The areas 26a,26b are near sides of the body 12 so that the linear extent of the bodies 12,13 must be aligned as shown in FIGS. 1 and 2 or as shown in FIG. 9 to make connecting use of the areas 26a,26b. Additionally, the pair of shallow recesses 26c,26d are in a line with each other and recess 27 at 90 degrees relative to the first mentioned line to function as the areas 26a,26b to hold a connection of the members 2,3 at right angle relation as shown in FIG. 8. The stepped protrusions 21,22 and the recesses 26a-26d may be tapered to facilitate separating the connection therebetween and rotation of the bodies 2,3 while preferably a substantial extent of teh protrusion 20 remains in receptacle 27 to maintain a physical connection between the bodies 2,3.

Figure 4:
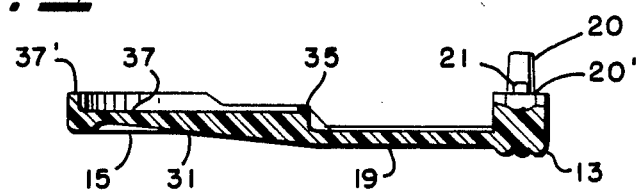
FIG. 4 is a section view of the lower part of the device looking generally in the direction of the arrows 4—4 of FIG. 3.

As an example, as is seen in FIG. 4, the member 20 is tapered approximately one degree from the normal to the surfaces of the enlarged body portion 13 from which the member protrudes. Such taper is on both sides of the member 20, although it may be only on a single side, if desired. Also, if desired, the receptacle itself may be tapered from a relatively wide opening into which the member 20 is inserted down to a relatively narrower bottom 28, while the sides of the member 20 are parallel to each other, this arrangement also providing the good force fit inter-engagement of such connector means 4.

The bodies 12,13 and connector means 4, as well as the support arms 18,19, are of a design and construction that facilitate injection molding thereof using relatively minimum amount of material, on the one hand, to manufacture the device 1, while, on the other hand, providing secure support for the wiping portion 10 of the device 1, strength of connection of the upper and lower parts 2,3 and facility of use of the device. Also, only a minimum number of parts are required to form the connector means 4. Curved, tapered ribs 28,29 along support arms 18,19 strengthen the latter while minimizing quantity of material required for the support means 7,8.

Figure 3:
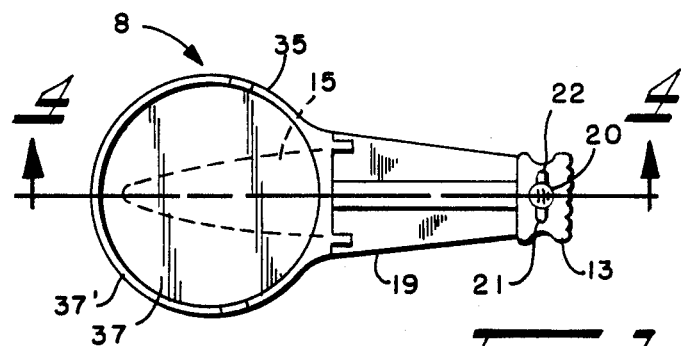
FIG. 3 is a top plan view of the lower part of the eyeglass wiping device with the wiping material and tape or other adhesive removed therefrom.
Figure 5:
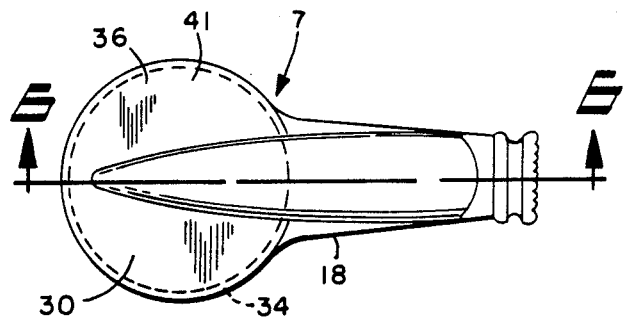
FIG. 5 is a top plan view of the upper part of the device.
Figure 6:
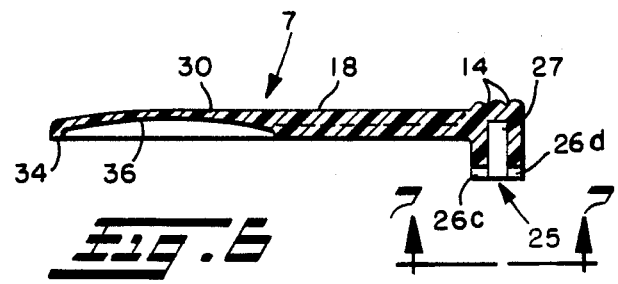
FIG. 6 is a section view of the upper part of the device with the wiping material and tape or other adhesive removed looking generally in the direction of the arrows 6—6 of FIG. 5.

Although the plan view width, as is seen in FIGS. 2, 3 and 5 of the enlarged bodies 12, 13 and support arms 18, 19 of the support means 7,8 are relatively narrow to minimize the material required to make the same, to minimize the cost for the same, to minimize the weight of the same, and to facilitate manual holding of the device 1, the plan view dimension of the holder heads 30,31 of support means 7,8 is of a relatively large size to maximize the quantity of wiping material 5,6 in the device 1 and, more particularly, to provide relatively large wiping surfaces 32, 33 of such material for wiping the respective surfaces of a lens. The holder heads 30, 31 of the support means 7, 8 are circular in plan view to enable use of circular wiping material 5,6 that relatively easily can wipe all portions of a lens which usually will not have sharp corners. The curved plan of the holder heads 30, 31 also avoids any sharp edges that might cut the material of a pocket or other container for the device 1 and also avoids the possibility of injury to a user by a sharp cornered device. The holder heads 30, 31 also have upstanding circumferential lips 34, 35, respectively about the respective edges of each platform 36, 37 of the holder heads generally confining the wiping material 5,6 within the circular boundaries of such edges or lips. On the other hand, the edges 34, 35 are relatively widely spaced from each other i.e. having a shorter height or vertical dimension than the thickness or vertical dimension of the wiping material 5,6, in order that a substantial quantity of wiping material will not be rigidly confined thereby so as to permit relatively facile deformation of the wiping material by a lens inserted between the surfaces 32, 33 thereof.

The surfaces 32, 33 of the wiping material 5,6 preferably are mounted in the holders heads 30,31 in a manner such that those surfaces are in direct abutting confrontation with each other most preferably along a plane identified as 40. The material 5, 6 most preferably has a resilient characteristic and preferably has a free form vertical dimension, i.e. when unsupported by respective holder heads 30, 31, greater than the space provided therefor between the respective platforms 36, 37 in the device 1 so that such wiping material 5, 6 will be under at least a slight compression with the surfaces 32, 33 engaged. Such slight compression reduces the possibility of dirt having access to and accumulating on the surfaces 32, 33 while the resilient nature of the material 5, 6 still is adequate to enable a lens to be inserted along the plane 40 to be wiped on both surfaces of the lens by the respective surfaces 32, 33 of the wiping material. The plan dimension or cross-section of the platforms 36, 37 and of the surfaces 32, 33 is such that ordinarily it would be somewhat smaller than the smallest diameter dimension of the ordinary eyeglass lens so that the lens may be inserted between the surfaces 32,33 in the device 1 and then the device 1 may be manipulated to cause those surfaces to wipe over the lens surfaces, preferably cleaning the same. Alternatively, in an event that the plan or a cross-section dimension of the surfaces 32, 33 exceeds that of a lens intended to be cleaned thereby, such lens still may be cleaned by the device 1, due to the resilient nature of the wiping material 5, 6 that may overlap the lens frame or other means used to hold the lens while it is moved between the surfaces 32, 33 engagement with portions thereof.

Preferrably the platform 36 of the holder head 30 is convex with respect to the plane 40 and the platform 37 of the holder head 31 is concave with respect to the plane 40 in order to match the usual shape of most eyeglass lenses which ordinarily have a concave surface and a convex surface. Usually the device 1 would be placed on an eyeglass lens to wipe the same in a manner such that the convex surface of the lens would engage the wiping material surface 32 so as to be generally parallel with the convex platform 36 that provides a generally uniform pressure against the lens during the wiping, then; and the concave surface of the lens would be placed in engagement with the wiping surface 33 so that such lens surface is parallel to the concave platform 37 which generally causes the wiping material surface 33 to apply approximately uniform pressure to such lens surface. The exterior portions of the respective convex and concave platforms 36, 37 also tends to facilitate manual grasping of the device 1. A guide rail 37' partially about the platform 37 helps position and secure the wiping material 6 on such platform since the convex curve thereof minimizes the effective height of the lip or edge there.

The wiping material 5, 6 is preferably formed of sponge or sponge-like material. Such material may be natural or synthetic. The preferred material is Scottfelt No. 4900 made by the Scott Paper Company which is anopen cell foam material. In one embodiment it has been found that a sponge material comprised of polyester and cotton, such a material being made by Rubbermaid Manufacturing Co., is a satisfactory choice of wiping material. A purely synthetic wiping material, for example a sponge made exclusively of polyester material, that is hard enough to effect a good wiping and is absorbent enough to wipe any moisture from the lens surfaces, also would be satisfactory. However, the hardness or abrasiveness of the wiping material should be minimized to the extent that it, of course, would be undesirable to scratch a lens during wiping thereof. The convex and concave platforms 36, 37, though, help to avoid the possibility of such a scratching. Moreover, to attach the wiping material 5, 6 to the respect platforms 36, 37 adhesive material applied directly or indirectly to the surface of the material 5,6 remote from the wiping surfaces 32,33, as is represented at 41, 42, may be employed. The adhesive material may permit the wiping material to be replaced, with other or cleaner material if desired, although in the preferred embodiment cleaning of the wiping material is possible so that replacement ordinarily would not be necessary.

Usually the vertical dimension or spacing of the respective holder heads 30, 31 would be preset according to the structural dimensions of the device 1 and the various portions thereof so that there is the desired resilient pressure between the surfaces 32, 33 without there being a need for resilient deformation of the support means 7, 8 during a wiping action. This presetting of the spacing between the holder heads and, thus, of the pressure of the surfaces 32, 33 against each other and, more specifically, against the surfaces of the lens, assures that a relatively controlled pressure will be exerted against such lens surfaces. It has been found that too great a pressure being exerted against the lenses not only may damage them, but also results in a less effective cleaning than a lighter, but controlled pressure would effect. However, if desired, the support arms 18, 19 and/or other portions of the respective support means 7, 8 may be made resilient to enable manual control of such wiping pressure. Also, to maintain the rigid strength of the support arms 18,19 and to help hold the present spacing of the platforms 36,37, strengthening ribs 43,44 may be provided at the junction of the bodies 12,13 and the support arms 18, 19.

Ordinarily after the upper and lower parts 2, 3 of the eyeglass wiping device 1 have been assembled in the manner illustrated in FIG. 1, such device is ready for use to wipe eyeglass lenses or the like. It is preferred that the connector means 4 not be disassembled, for in that case the strength of subsequent connections would be diminished; however, if desired, for example for cleaning the wiping material 5, 6 or for replacing the same, such a parting at the connector means 4 may be permitted, depending on the strength of the connection there.

In using the eyeglass wiping device 1, a person would in one hand hold a pair of eyeglasses with the temple legs pointing away from the person. The device 1 would be held in a manner such that the upper and lower convex and concave platforms 36, 37 are parallel with the corresponding upper and lower convex and concave surfaces of the eyeglass lenses. One lens of the pair of eyeglasses would be placed between the wiping material 5, 6 generally along the plane 40 and the user may wipe the entire lens preferably with linear motion until the lens becomes satisfactorily clean. This step may be repeated for the other lens of the eyeglasses.

If the wiping material 5, 6 were to become excessively dirty, they may be washed with a constant flow of warm water thereover. The material 5, 6 may be dried by squeezing them together releasing excess water and, thereafter, a paper towel may be placed therebetween to absorb any water residue.

If desired, a small quantity of cleaning solvent or material may be placed in or near the center of each surface 32,33 of the wiping material 5,6 or even throughout such wiping material to assist in cleaning eyeglass lenses, for example. An example of such cleaning material may be one or a combination of silicone materials, such as, for example SF-1173 (a silicone cleaning agent) and/or Visocil (a silicone polishing and defogging agent) both sold by General Electric Company. The ratio of such materials may be varied depending on the desired relative amount of cleaning and/or polishing to be accomplished.

The device 1 also may be used in an open mode by pivoting the bodies 12,13 to the 90 degree or 180 degree positions shown, respectively, in FIGS. 8 and 9. When in the 90 degree position of FIG. 8, the stepped protrusions 21,22 lock into recesses 26c,26d; in the 180 degree position the protrusions 21,22 lock into the recesses 26b,26a, respectively. Such locking in both the open modes of FIGS. 8 and 9 and closed mode of FIGS. 1 and 2, for example, prevents separation of the parts 12, 13 during sue and also facilitates secure manual grasping and manipulation of the device 1. In the open modes, the device 1 may be used to wipe camera lenses, large surfaces that otherwise could not or could not conveniently fit in the device 1 in the closed mode.

The stepped protrusion/recess arrangement of the connector mechanism 4 not only provides multiple locked positions, but also facilitates break away opening of the device 1 from any one of the locked positions shown to an unlocked condition. For this purpose, the stepped protrusions 21,22 and/or the shallow recesses 26a–26d may be slightly tapered to urge the bodies 12,13 away from each other when twisting force is applied to the device 1 tending to rotate the bodies 12,13 in opposite directions about the axis (passing through ad parallel to the protrusion 20 and recess 27) of rotation of the device 1. However, the protrusion 20 ordinarily remains in the recess 27 during such relative rotation to maintain the bodies 12,13 linked together. After the bodies have been rotated to the desired position, though, they may be urged toward each other along such rotational axis to lock the stepped protrusions 21,22 into a respective pair of recesses 26a–26d.

STATEMENT OF INDUSTRIAL APPLICATION

With the foregoing in mind it will be clear that the wiping device 1 may be used to wipe eyeglass lenses or other surfaces to remove dirt and the like.

I claim:

1. Apparatus for wiping lenses or the like comprising a pair of wiping means for wiping a lens or the like, a pair of support means for supporting respective wiping means in relation to each other to wipe a lens placed therebetween, and connector means for connecting said support means to support said wiping means in opposed relation to each other to wipe a lens or other device, said connector means including a stepped recess at an end of one of said support means and stepped protrusion means of an end of the other of said support means for insertion into said recess to form a secure connection between said support means, said connector means including means for permitting relative rotation of said support means while still connected together, said stepped recess means comprising a deep recess and a pair of shallow recesses, said recesses being in side-by-side connecting relations, and said stepped protrusion means comprising a relatively long protrusion and a pair of shorter height stepped protrusion members, said long protrusion being positioned in said deep recess and said shallower protrusion members being positioned in respective shallow recesses.

2. The apparatus of claim 1, said stepped recess being tapered to facilitate relative rotation of said support means.

3. The apparatus of claim 1, said stepped protrusion means being tapered to facilitate relative rotation of said support means.

4. The apparatus of claim 1, said stepped recess comprising two pairs of said shallow recesses, one pair being arranged along a line including said deep recess and the other pair being arranged along a line perpendicular with said first mentioned line and also including said deep recess.

5. The apparatus of claim 1, said wiping means comprising sponge-like material.

6. The apparatus of claim 1, said wiping means comprising felt-like material.

7. The apparatus of claim 1, said support means further including a pair of relatively large head portions at which respective wiping means are operatively coupled thereto, one of said head portions being concave and the other of said head portions being convex with respect to a plane therebetween.

8. The apparatus of claim 1, said support means including body means proximate an end of said support means remote from said wiping means for facilitating grasping by the hand of a user, said body means including a curved portion leading toward a respective wiping means to guide a part of the hand of a user to secure holding of the apparatus for use to wipe a lens or the like.

9. The apparatus of claim 1, each of said support means comprising an arm, a body portion forming said connector means, and enlarged holder head means at an end of each arm for holding respective wiping material.

10. The apparatus of claim 9, further comprising lip edge means generally circumscribing at least a portion of at least one of said holder head means for holding said wiping material in position on said holder head means.

11. The apparatus of claim 1, further comprising strengthening ribs along substantially the entire length of at least one of said support means and along part of the length of the other support means.

12. The apparatus of claim 1, said wiping means being at least partially absorbent, and further comprising at least one of a cleaning and polishing agent in said wiping means.

13. The device of claim 12, said agent comprising a silicone material.

* * * * *